United States Patent
Biskeborn et al.

(10) Patent No.: US 9,001,462 B2
(45) Date of Patent: Apr. 7, 2015

(54) UNIVERSAL MAGNETIC RECORDING HEAD CHIP

(71) Applicant: International Business Machines Corporation, Armonk, NY (US)

(72) Inventors: Robert G. Biskeborn, Hollister, CA (US); Calvin S. Lo, Saratoga, CA (US); Kevin T. Luong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/677,240

(22) Filed: Nov. 14, 2012

(65) Prior Publication Data
US 2014/0133049 A1   May 15, 2014

(51) Int. Cl.
*G11B 5/127* (2006.01)
*G11B 5/49* (2006.01)

(52) U.S. Cl.
CPC ......................................... *G11B 5/49* (2013.01)

(58) Field of Classification Search
CPC ........... G11B 5/00826; G11B 5/00865; G11B 5/00878
USPC ........................................... 360/90, 110, 121
See application file for complete search history.

(56) References Cited

U.S. PATENT DOCUMENTS

| | | | |
|---|---|---|---|
| 5,237,476 A * | 8/1993 | Bischoff et al. ............ 360/123.1 |
| 5,436,780 A | 7/1995 | Nagata et al. | |
| 6,038,108 A * | 3/2000 | Dee et al. ....................... 360/121 |
| 6,522,499 B1 * | 2/2003 | Takayama et al. ............ 360/129 |
| 7,092,192 B1 * | 8/2006 | Yoshihiro .................. 360/73.06 |
| 7,154,691 B2 | 12/2006 | Girvin et al. | |
| 7,193,812 B2 * | 3/2007 | Eaton ............................ 360/121 |
| 7,266,880 B2 | 9/2007 | Biskeborn et al. | |
| 7,480,117 B2 | 1/2009 | Biskeborn et al. | |
| 7,551,393 B2 | 6/2009 | Biskeborn et al. | |
| 7,724,465 B2 | 5/2010 | Koeppe | |
| 7,766,236 B2 | 8/2010 | Biskeborn et al. | |
| 7,782,564 B2 | 8/2010 | Biskeborn et al. | |
| 2005/0134989 A1 * | 6/2005 | Girvin et al. ..................... 360/61 |
| 2007/0047146 A1 * | 3/2007 | Biskeborn et al. ............. 360/240 |
| 2007/0103812 A1 * | 5/2007 | Biskeborn et al. ............. 360/122 |
| 2008/0218900 A1 * | 9/2008 | Hachisuka et al. ............. 360/90 |
| 2008/0291566 A1 * | 11/2008 | Biskeborn et al. .............. 360/75 |
| 2009/0231756 A1 * | 9/2009 | Koeppe .......................... 360/110 |
| 2009/0231757 A1 | 9/2009 | Biskeborn et al. | |
| 2012/0033332 A1 * | 2/2012 | Bandy et al. .................. 360/323 |

\* cited by examiner

*Primary Examiner* — Adam B Dravininkas
(74) *Attorney, Agent, or Firm* — Zilka-Kotab, PC

(57) ABSTRACT

A module according to one embodiment includes an array of N piggyback or merged first data transducers positioned towards a media facing surface of the module; and M second data transducers interleaved with the array of piggyback or merged data transducers, wherein the second data transducers are single data transducers, at least some of the data transducers being coupled to pads. A module according to another embodiment includes an array of N first data transducers positioned towards a media facing surface of the module, the first data transducers including at least one of data readers, data writers, and combinations thereof; and M second data transducers interleaved with the array of first data transducers, the second data transducers including at least one of data readers, data writers, and combinations thereof, wherein less than all of the first and/or second data transducers are coupled to pads.

20 Claims, 15 Drawing Sheets

UNIVERSAL MAGNETIC RECORDING HEAD CHIP

BACKGROUND

The present invention relates to data storage systems, and more particularly, this invention relates to managing tape head modules selectively tailored for use in potentially incompatible products.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

BRIEF SUMMARY

A module according to one embodiment includes an array of N piggyback or merged first data transducers positioned towards a media facing surface of the module; and M second data transducers interleaved with the array of piggyback or merged data transducers, wherein the second data transducers are single data transducers, at least some of the data transducers being coupled to pads.

A module according to another embodiment includes an array of N first data transducers positioned towards a media facing surface of the module, the first data transducers including at least one of data readers, data writers, and combinations thereof; and M second data transducers interleaved with the array of first data transducers, the second data transducers including at least one of data readers, data writers, and combinations thereof, wherein less than all of the first and/or second data transducers are coupled to pads.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a module includes an array of N piggyback or merged first data transducers positioned towards a media facing surface of the module; and M second data transducers interleaved with the array of piggyback or merged data transducers, wherein the second data transducers are single data transducers, at least some of the data transducers being coupled to pads.

In another general embodiment, a module includes an array of N first data transducers positioned towards a media facing surface of the module, the first data transducers including at least one of data readers, data writers, and combinations thereof; and M second data transducers interleaved with the array of first data transducers, the second data transducers including at least one of data readers, data writers, and combinations thereof, wherein less than all of the first and/or second data transducers are coupled to pads.

Figure 1:
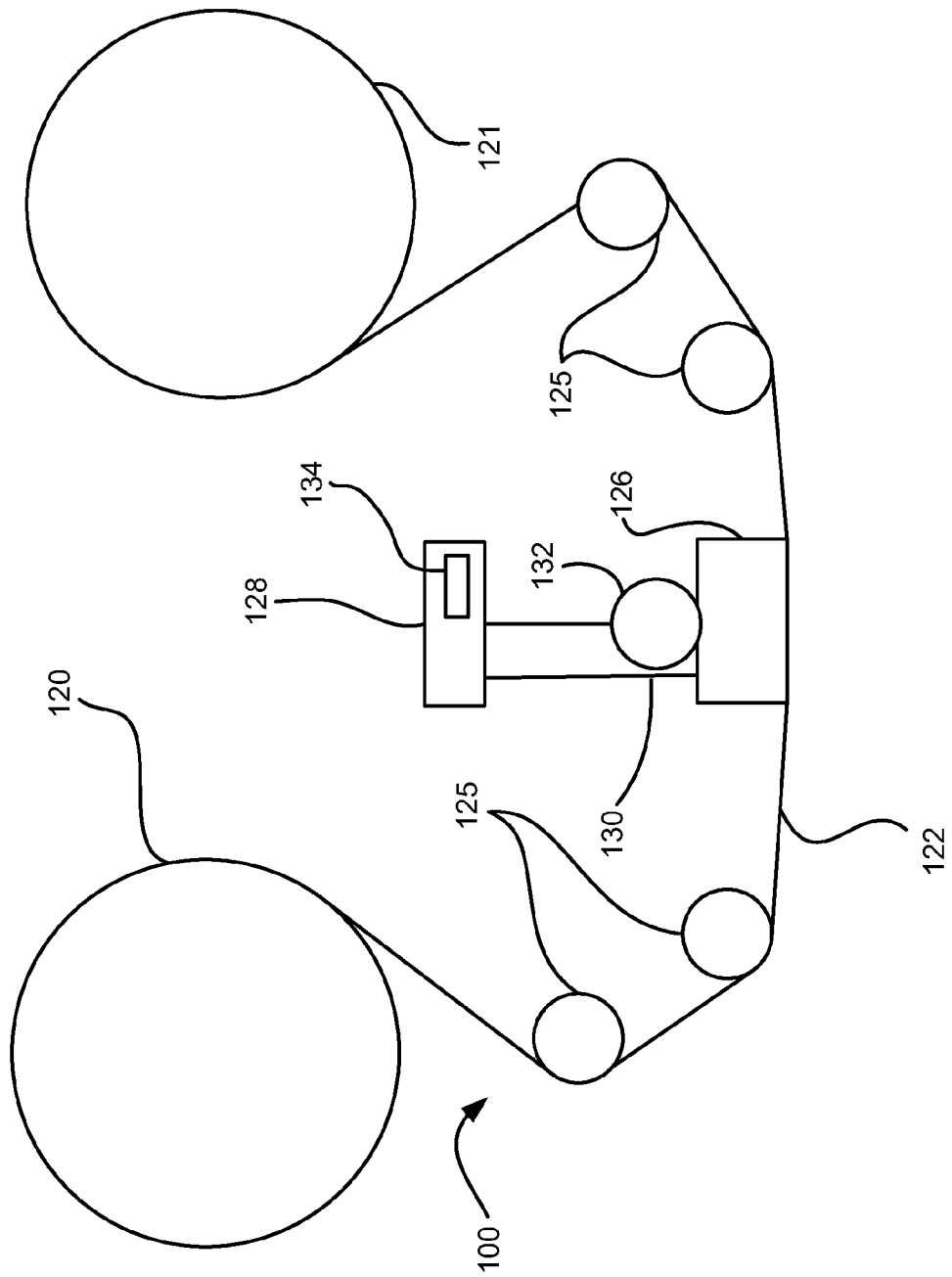
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
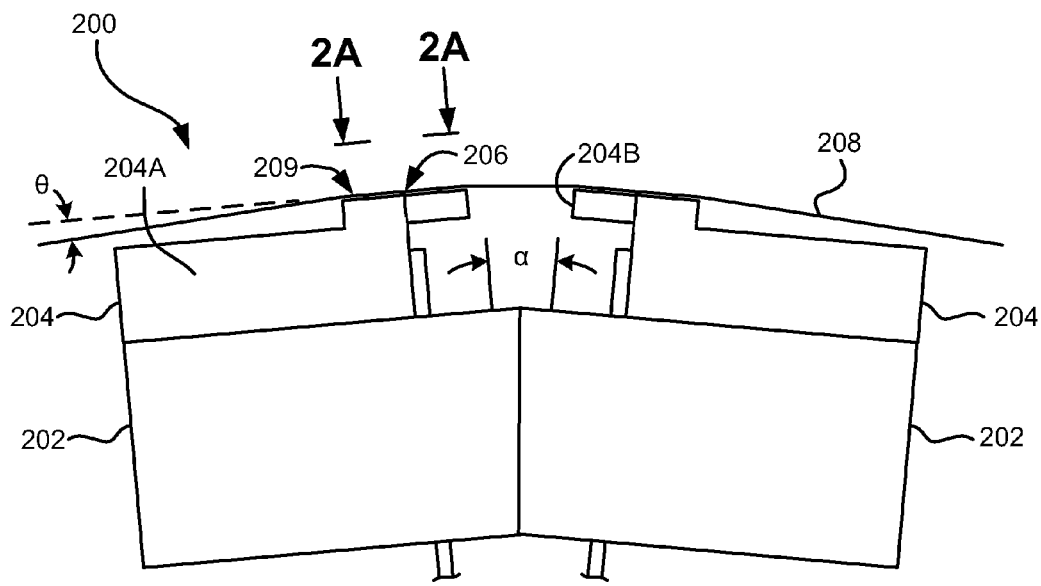
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
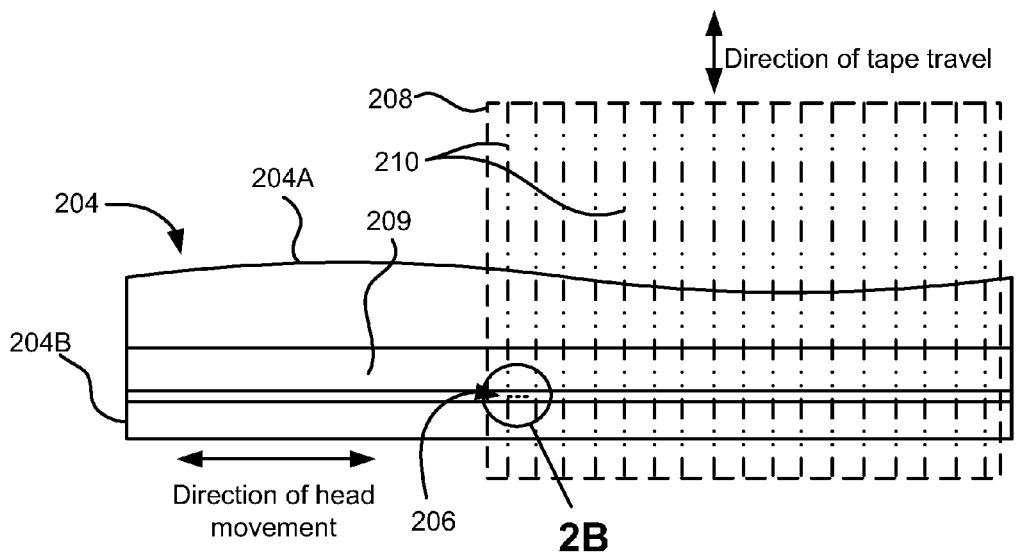
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 512 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
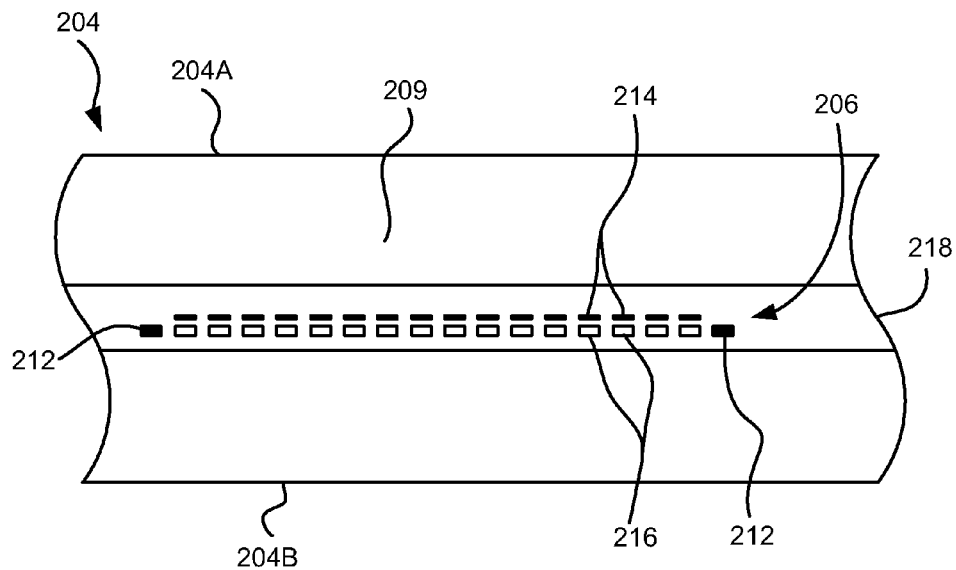
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
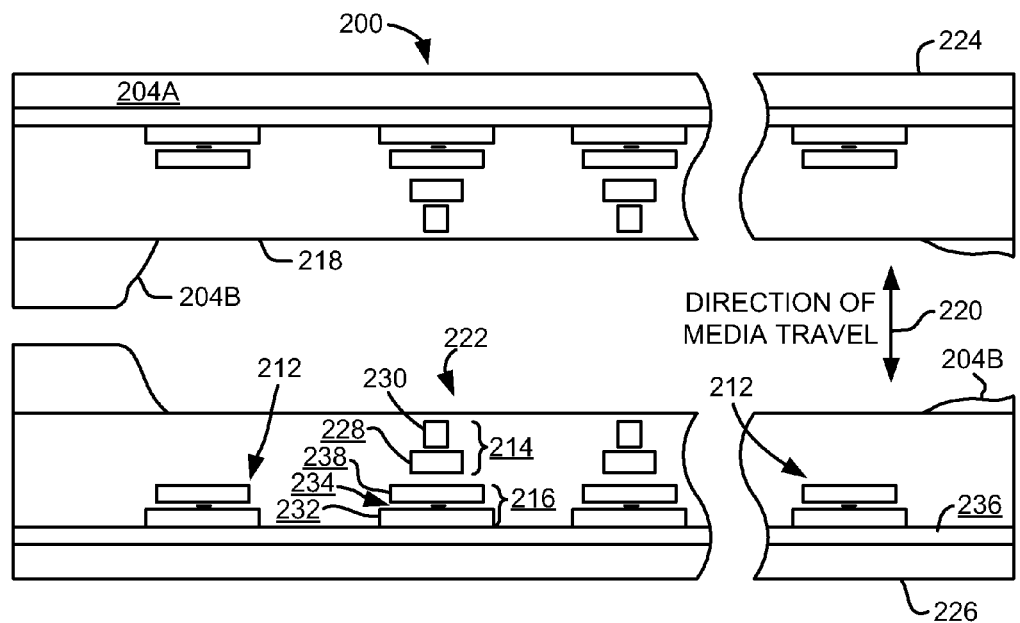
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
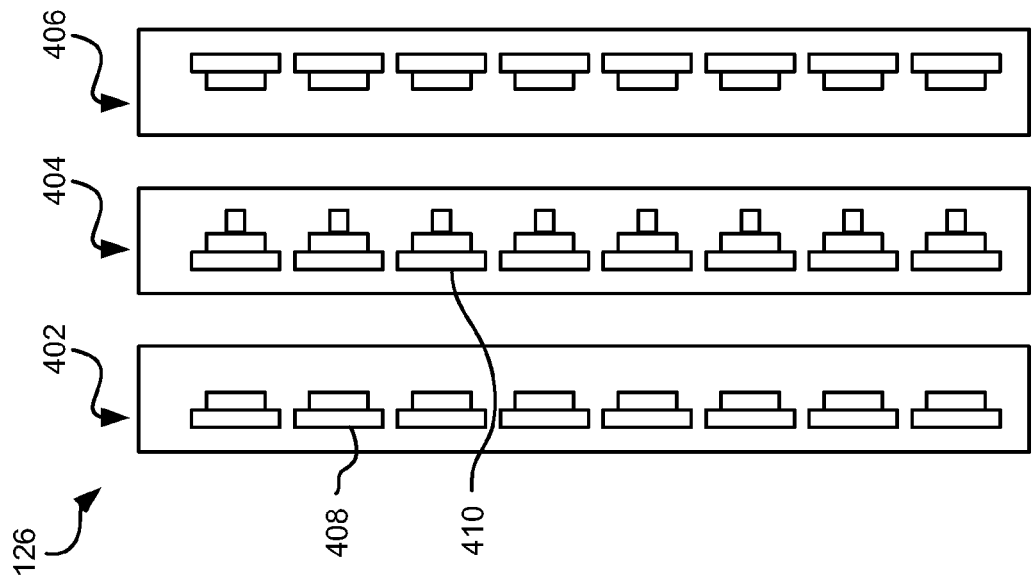
FIG. 4 is a partial tape bearing surface view of a magnetic head having a read-write-read configuration.
Figure 3:
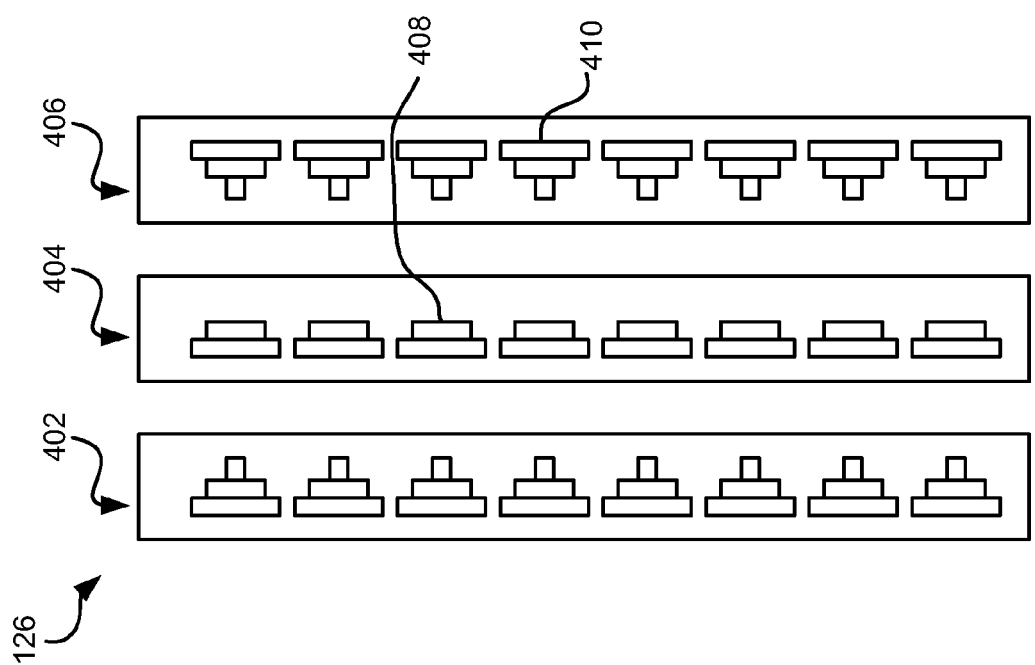
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 402, 406 each include one or more arrays of writers 410. The inner module 404 of FIG. 3 includes one or more arrays of readers 408 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
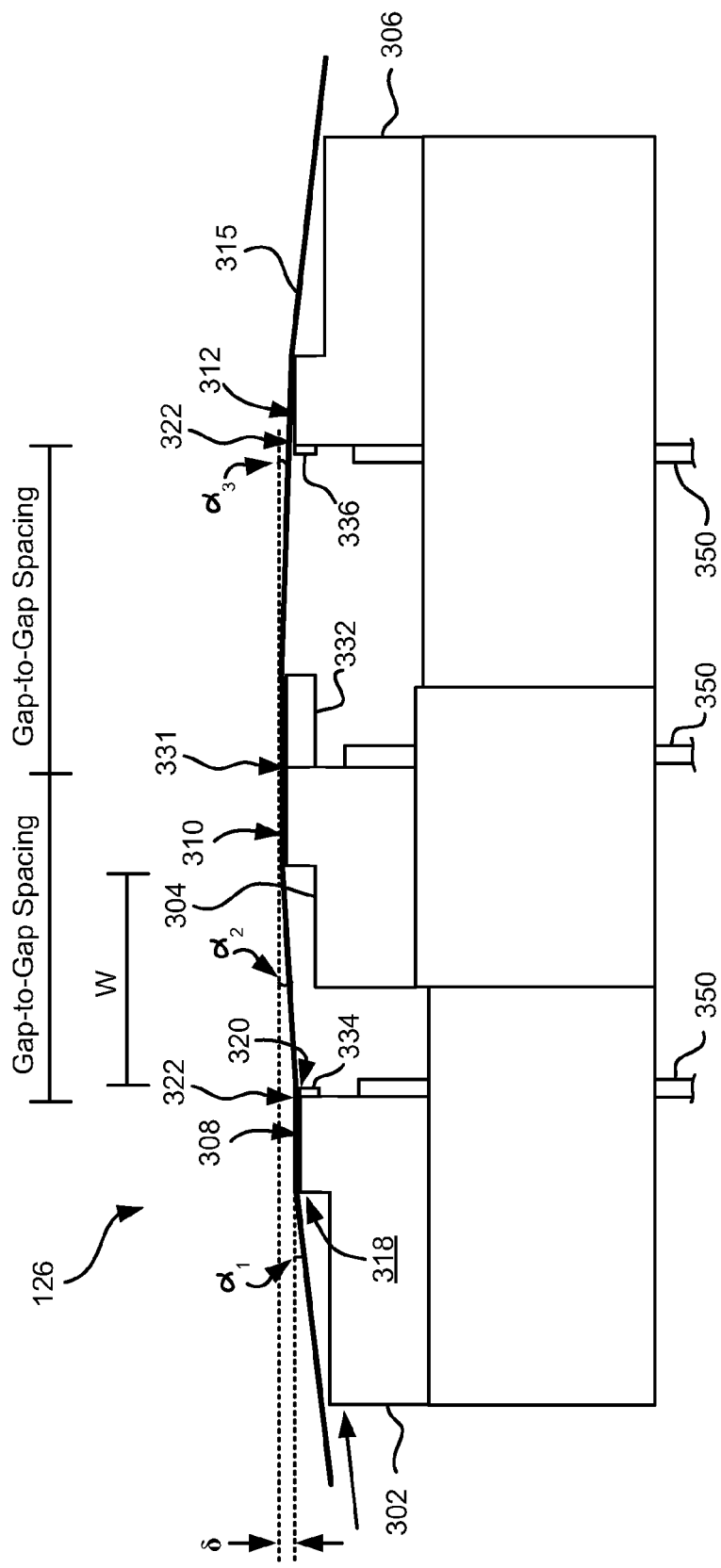
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
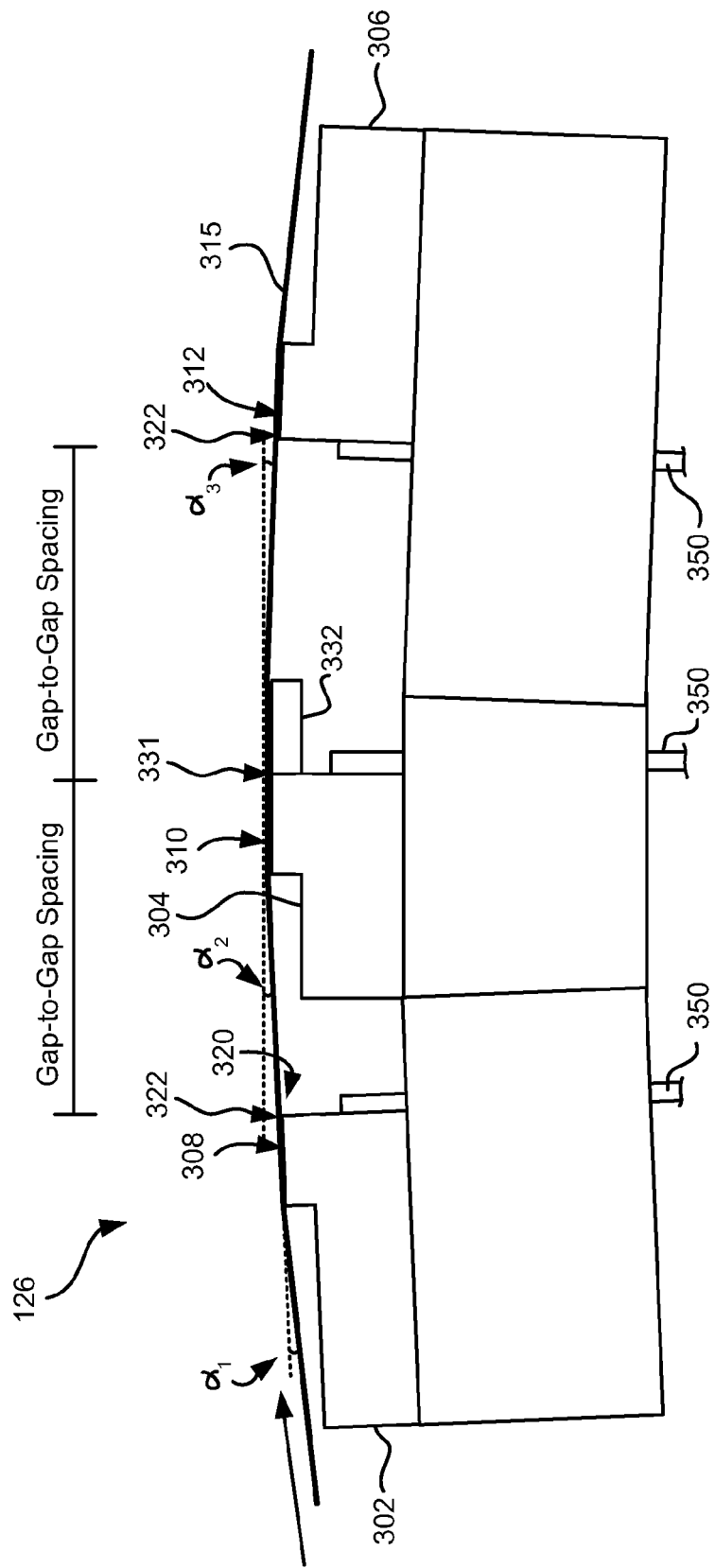
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
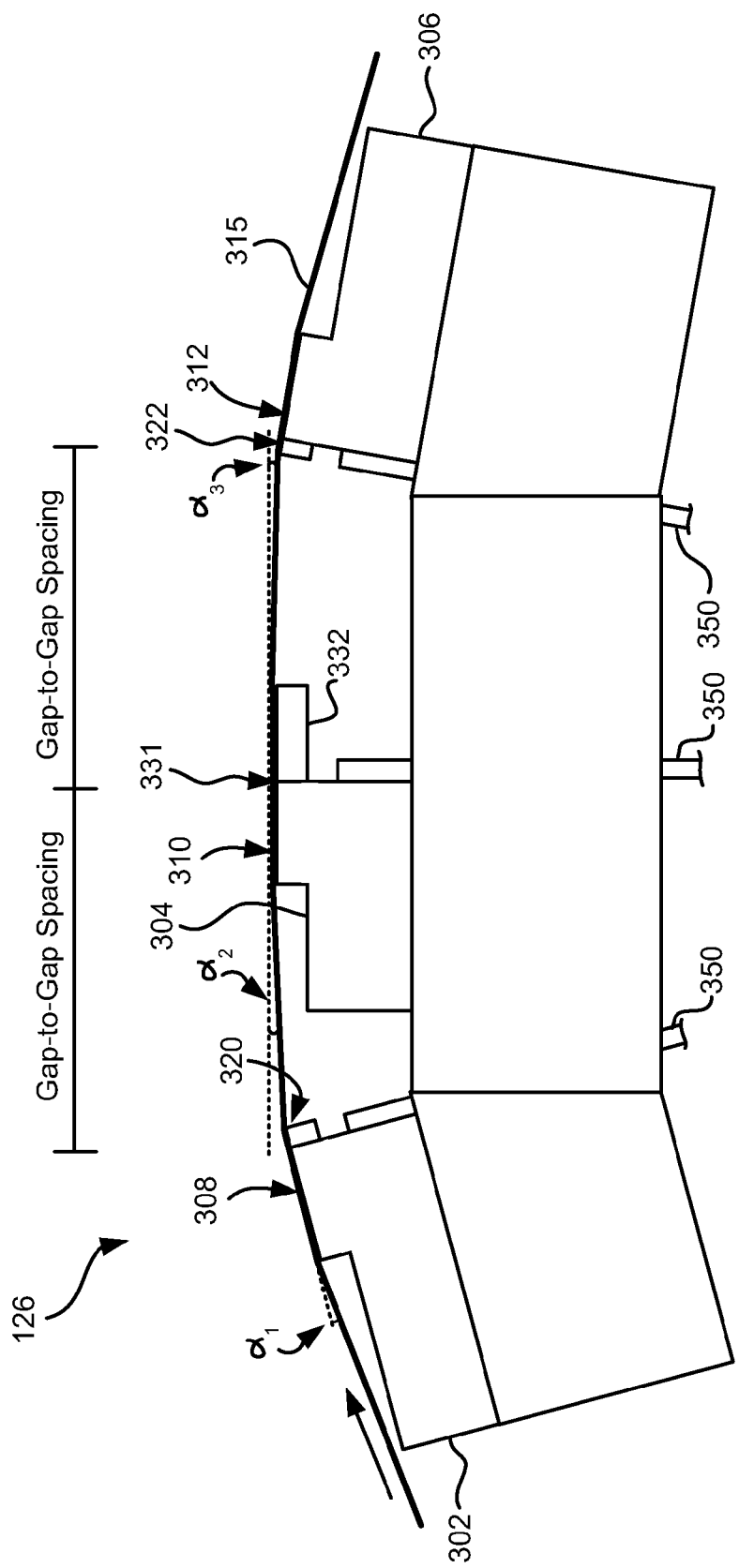
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 24 or higher channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables may be used for the writer modules, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

It will be clear that the various features of the foregoing methodologies may be combined in any way, creating a plurality of combinations from the descriptions presented above.

Conventionally, different module designs such as read or write only module formats and a piggyback read/write module formats lack the ability to function in more than one product type, e.g., the module from the piggyback format cannot be used for the read-only or write-only format and vice versa. Although the transducers used in different designs are potentially identical, module designs have been unsuccessful thus far in achieving compatibility with more than one product type. Therefore it would be favorable to develop a module design selectively compatible with multiple, if not all currently used product types.

Figure 8:
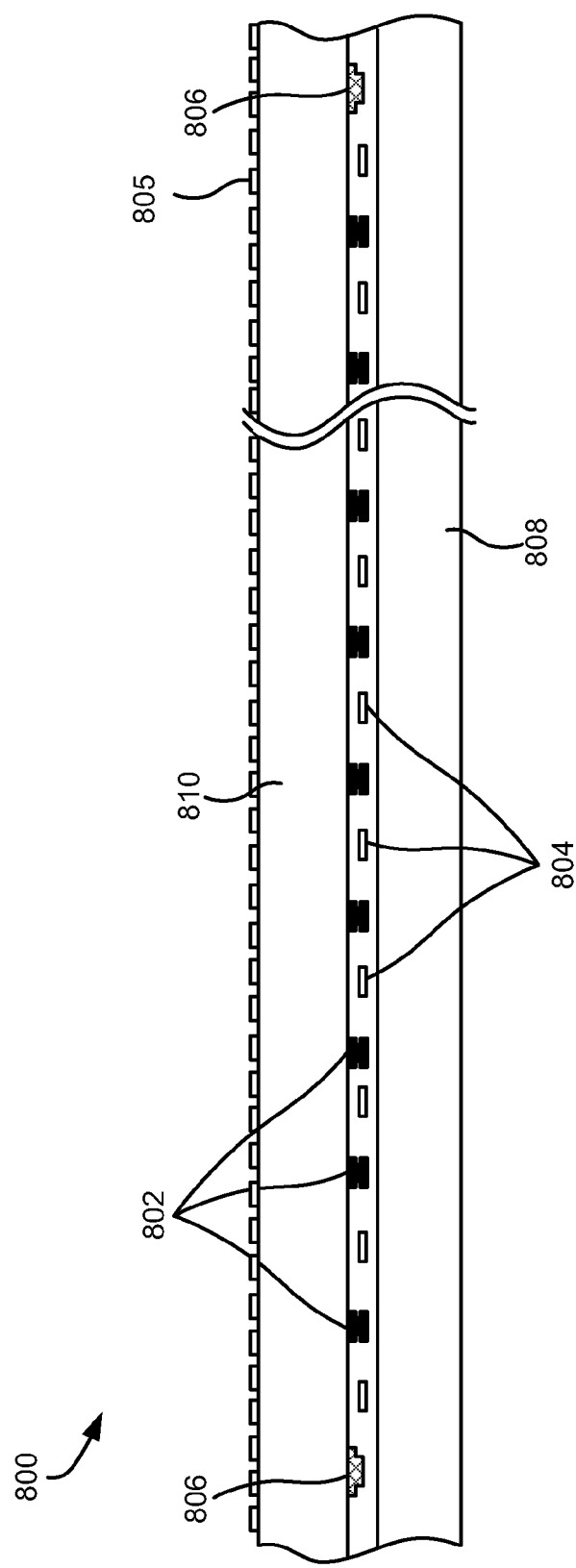
FIG. 8 is a partial tape bearing surface view of a module according to one embodiment.

Referring to FIG. 8, the module 800 includes an array of N piggyback or merged first data transducers 802, positioned towards a media facing surface of the module 800. The first data transducers preferably include at least one of data readers, data writers, or combinations thereof. In one approach, the first data transducers 802 may be positioned in a gap between the closure 808 and the substrate 810 of the module 800.

The module 800 also includes M second data transducers 804 interleaved with the array of piggyback or merged first data transducers 802, where M as used herein is defined as N±P, where P=0, 1, 2, 3, etc. In this case, one of the M second data transducers 804 may be located between each of the N piggyback first data transducers 802, and the servo readers 806 such that each of the N piggyback first data transducers 802 has a second data transducer 804 on at least one side. Exemplary embodiments of various arrays may include 8, 16, 24, 32, 40, 48, 56, 64, etc. first and/or second transducers.

According to different approaches, the second data transducers may include at least one of data readers, data writers, or combinations thereof. Thus, the second data transducers may be piggybacked, merged, single, etc. data transducers. In a preferred approach, the second data transducers may be single data transducers. In accordance with the present embodiment, "single data transducers" is meant to signify that the data transducers are not part of a piggyback or merged data transducer pair, are not a servo reader, and function only to read or write. In one approach, the second data transducers may either be all writers or all readers depending on the intended function of the module.

The readers and/or writers of the first and second data transducers may be of identical design (except, of course, for the slight variations inherent in thin film fabrication). In other approaches, the designs may be different. Moreover, in a preferred approach, at least some of the first and/or second data transducers 802, 804 may be coupled to pads 805.

Figure 9:
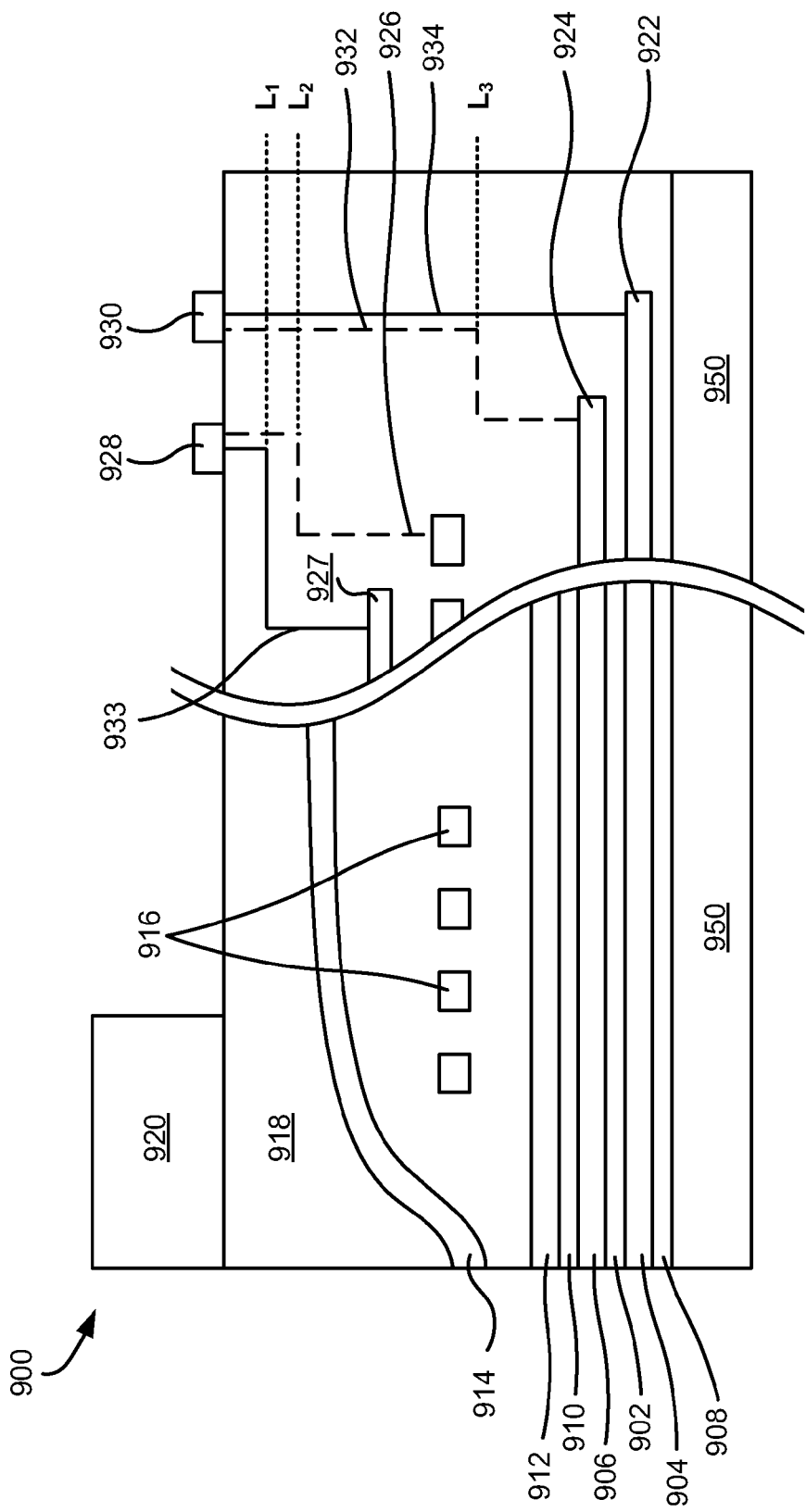
FIG. 9 is a partial cross-sectional view of a module according to one embodiment.

Referring now to FIG. 9, a module 900, according to an exemplary embodiment, includes a wafer substrate 950, above which is a read transducer 902 with shields 904, 906. The module 900 additionally includes insulation layers 908, 910 to insulate the shields 904, 906 from adjacent layers. In a preferred approach, either and/or both of the insulation layers 908, 910 may be nonmagnetic.

As depicted in FIG. 9, the writer poles 912 and 914 may sandwich the coils 916; above which may be an overcoat 918 and finally an optional closure 920 coupled thereto, e.g., by an adhesive (not shown) of a type known in the art.

With continued reference to FIG. 9, the module 900 further includes pads 928, 930. According to various approaches, the pads may include conductive metals e.g., gold, copper, silver, aluminum, etc.; conductive oxides; etc. Preferably the pads 928, 930 may include materials which are non-corrosive to prevent and/or minimize degradation of the pads.

The pads may preferably be coupled to one, at least one, some, all, etc. of the transducers of the module, thereby implementing a different number of read and/or write transducers depending on the desired embodiment.

According to various approaches, different desired embodiments may include a design which implements a different number of read and/or write transducers. Thus, exemplary embodiments of various arrays may include 8, 16, 24, 32, 40, 48, 56, 64, etc. first and/or second transducers. For example, if the head is to be used for a 32 channel mode and the single data transducers are writers, then the single data transducers and the writers of piggyback and/or paired data transducers are coupled to the pads, while the readers of the piggyback and/or paired transducers are not. Thus, a universal array of transducers that is compatible with multiple formats may be adapted for use with a selected one of the formats by simply coupling the appropriate transducers to pads during manufacture. More examples will be provided below, including illustrative examples of pad coupling schemes (see FIGS. 11A-11C).

In a preferred approach, the pads may be coupled to the transducers via leads and/or pad-outs, which may also be implemented in different combinations to achieve the desired embodiment. Referring still to FIG. 9, transducers may be in electrical communication with the pads 928, 930 via leads 924, 922 and 927 and pad-outs 932, 933, 934, 926. According to various approaches, various portions of the conductive path may include conductive layers, conductive vias, secondary leads, cables, etc. Moreover, the pad-outs may include forming conductive vias through the thin film stack as illustrated in FIG. 9. According to different approaches, forming the pad-outs may include masking, milling, deposition, plating, etc.

According to various approaches, the leads may be coupled to the pads by any method of coupling which would be apparent to one skilled in the art upon reading the present description. As alluded to above, when constructing the wafer, one of the last steps may include padding-out selected leads from their respective levels in the stack, corresponding to the desired functionality of the module. Therefore, not all leads connected to transducers may be coupled to pad-outs, depending on the desired embodiment (explained in further detail below).

Thus, according to various approaches, the pads 928, 930 may be arranged in a preferred orientation, e.g., a single row, first and second rows, etc., to accommodate the desired embodiment. FIGS. 10A-10F depict different orientations of pads 1002, 1004 in accordance with several embodiments. As an option, the different orientations of pads 1002, 1004 may be implemented in conjunction with features from any other embodiment listed herein, such as those described with reference to the other FIGS. Of course, however, such orientations of pads 1002, 1004 and others presented herein may be used in various applications and/or in permutations which may or may not be specifically described in the illustrative embodiments listed herein. Further, the different orientations of pads 1002, 1004 presented herein may be used in any desired environment.

Referring now to FIGS. 10A-10F, pads 1002, 1004 may be arranged in various orientations according to the desired embodiment. It is preferred that the distance between coupled pads and transducers be as short as possible, thereby minimizing noise, time delay, power consumption, etc. However, the pads 1002, 1004 may include any pad type, configuration, and/or orientation which is disclosed and/or suggested herein, or any other pad which would be apparent to one skilled in the art upon reading the present description.

Figure 10A:
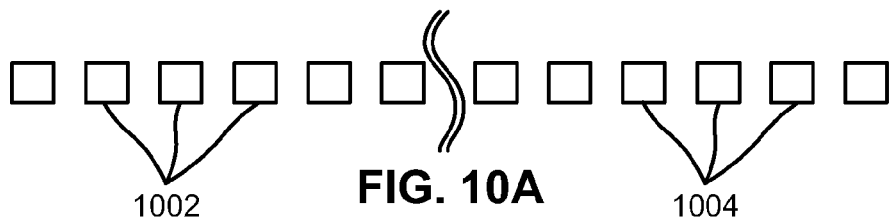
FIG. 10A-10F are representative illustrations of different orientations of pads according to several embodiment.
Figure 10B:
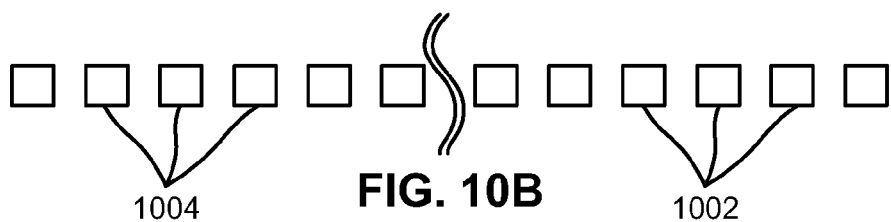

As illustrated in FIG. 10A, the pads 1002, 1004 may be oriented in a single row, such that the pads 1002 intended for the first data transducers are positioned on the left while the pads 1004 intended for the second data transducers are positioned on the right. The opposite orientation may also be implemented as shown in FIG. 10B where the pads 1002 intended for the first data transducers are positioned on the right while the pads 1004 intended for the second data transducers are positioned on the left. In a preferred approach, the single row of pads is preferably arranged along a single, straight line, but is not limited thereto. In other approaches, the single row may be slanted, at an angle, varied therealong, etc.

Figure 10C:
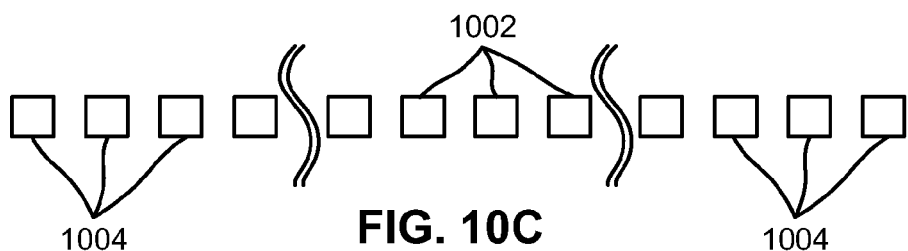
Figure 10D:
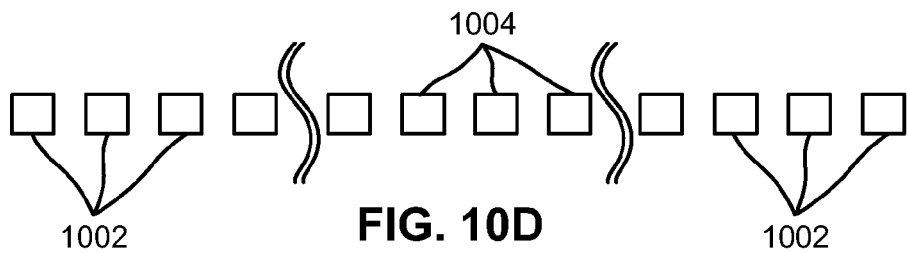

Referring to FIG. 10C, the pads 1002, 1004 may be oriented in a single row, such that a group of pads 1002 intended for the first data transducers are positioned between groups of pads 1004 intended for the second data transducers. Again, the opposite orientation may also be implemented as shown in FIG. 10D where a group of pads 1004 intended for the second data transducers are positioned between groups of pads 1002 intended for the first data transducers.

In yet another approach, the pads 1002, 1004 may be interleaved.

Figure 10E:
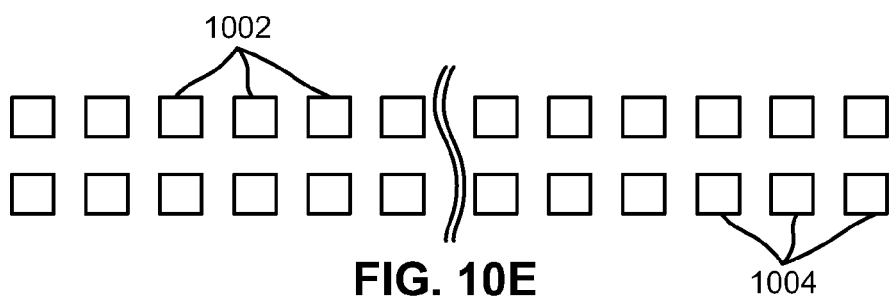
Figure 10F:
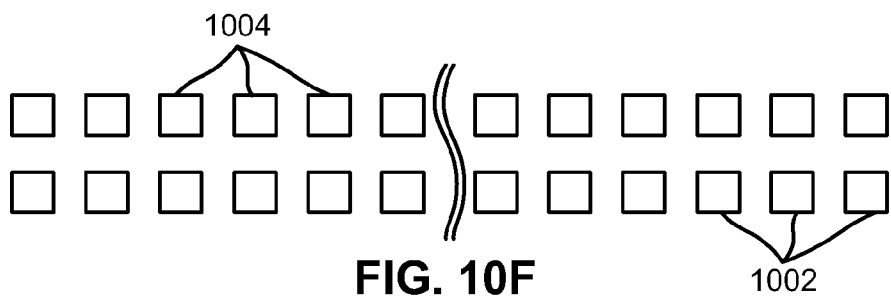

Referring now to FIG. 10E, the pads 1002, 1004 may be oriented in two rows such that the pads 1002 intended for the first data transducers are positioned above the pads 1004 intended for the second data transducers. Yet again, the opposite orientation may also be implemented as shown in FIG. 10F.

As previously mentioned, in some embodiments, not all transducers are coupled to pads. According to various approaches, the module having two rows of pads may be configured for a particular format; e.g., the first row of pads may be coupled to the data transducers, while the second row of pads may not be coupled to any of the data transducers; only some of the pads in the first row may be coupled to data transducers, while some or all of the pads in the second row are coupled to data transducers; at least some, a majority, all, etc. of the leads extending from the second transducers may be in electrical communication with pads in the first row, while at least some, a majority, all, etc. of the leads extending from the second transducers may be in electrical communication with pads in the second row; etc. In a further embodiment, referring to FIG. 9B, at least some of the leads 935, 939 extending from a second transducers 937 (shown in shadow because it is positioned behind the plane of the view of FIG. 9B ma be in electrical communication with pads 928 in the first row and pads 930 in the second row, respectively.

In a preferred approach, the pads of each the first and second rows may be in their own respective single, straight line, but are not limited thereto. In other approaches, first and second rows may be slanted, at an angle, varied therealong, etc. Moreover, each of the first and second rows may have similar, the same or different orientation with respect to each other.

Depending on the desired embodiment, the module may have a set minimum number and/or position associated with its transducers and/or pads. As shown in FIGS. 10A-10E, various orientations are available to accommodate the desired embodiment of the module. However, in a further approach, a module may include enough transducers and/or pads to accommodate any desired embodiment.

As alluded to above, leads and/or pad-outs may extend between the transducers and pads, thereby coupling the transducers and pads together. Thus, depending on the desired embodiment, the leads and/or pad-outs may be arranged such that different transducers may be coupled to different pads, corresponding to the desired embodiment (see FIGS. 11A-11C). For example, a module may have an adequate number of transducers and pads to form a 8, 16, 32, 40, etc. transducer, interleaved, piggyback, high density write only, etc. module. Therefore, depending on the desired embodiment of a module, the leads and/or pad-outs may connect the appropriate transducers and pads. Moreover, leads extending from the transducers may be coupled to the pads, regardless of the pads' respective orientation.

As alluded to above, when constructing the wafer, one of the last steps may include padding-out selected leads from their respective levels in the stack, corresponding to the desired functionality of the module. As depicted in FIG. 9, the module 900 includes leads 922, 924, 927 extending from some or each of the first and second data transducers of both the first and second data transducer sets. The number and location of the leads coupled to the pads via the pad-outs, e.g., conductive vias, secondary leads, cables, etc., determines which transducers are functional in the module. Thus, if the leads from read transducers of the first and second data transducers are coupled to the pads, then the module may act as a read-only module e.g., having 24, 32 or more read channels. However, if the leads from the readers and writers of only the first transducers are coupled to the leads, then the module functions as a read/write module, e.g., having 16 read channels. See the description of FIGS. 11A-11C below for further embodiments.

Referring again to FIG. 9, leads 922, 924 are coupled to the read transducer 902. In one approach, the shields 904, 906 may act as the leads 922, 924, e.g., as in a design where the read current travels perpendicular to the plane of the thin films of the read transducer. In another approach, the leads may be in a same plane, e.g., as in a design where the read current travels in the plane of the thin films. Leads 926, 933 are coupled to the coil 916. Conventional and/or other lead designs may be used for any of the transducers, as would be apparent to one skilled in the art upon reading the present disclosure.

It is generally unfavorable for the leads of readers and writers to be interleaved due to the high possibility of crosstalk. The large amount of current delivered to the writers through the leads to perform a write operation may easily be coupled into the reader leads if they are sufficiently close. Even in the case where the readers are not being used during a write operation, the signal coupling is strong enough to cause leakage back through the reader leads and have even been known to disrupt the controller card functionality. Therefore, it is preferable that the leads for the writers and readers be separated to different levels in the stack on the wafer. With continued reference to FIG. 9, the pad-outs 933, 926, 932, are separated into a first level $L_1$, a second level $L_2$, and a third level $L_3$ in the stack on the wafer. Moreover, pad-out 934 is shown as not being formed in a level in the stack, but rather is connected directly to pad 930, while pad out 932 is coupled to a pad behind pad 930. Thus, in one approach pad-outs may not be separated by levels in the stack on the wafer. In yet another approach, pad-outs may share one or more level.

Accordingly, in one approach, leads extending from the data readers of the first data transducers may be present in a first level of thin films of the module, and may optionally lie in a common plane, but need not. Additionally, leads extending from the coils of the first data transducers may be present in one or more levels of thin films of the module, e.g., in a region above the leads of data readers. Such leads may lie in one or more common planes, but need not. According to various approaches, the first and second levels, and leads therein, may be arranged in any order vertically and/or horizontally above the wafer substrate.

Furthermore, leads extending from the second data transducers may be present in a third level of thin films of the module. In one approach, the leads extending from the second data transducers may be present in the first level of thin films of the module if the second data transducers include data readers. In another approach, the leads extending from the second data transducers may be present in the second level of thin films of the module if the second data transducers are data writers. According to various other approaches, the three levels may be arranged in any order vertically above the wafer substrate. In further approaches, the leads may be partitioned into more than three levels.

Figure 9A:
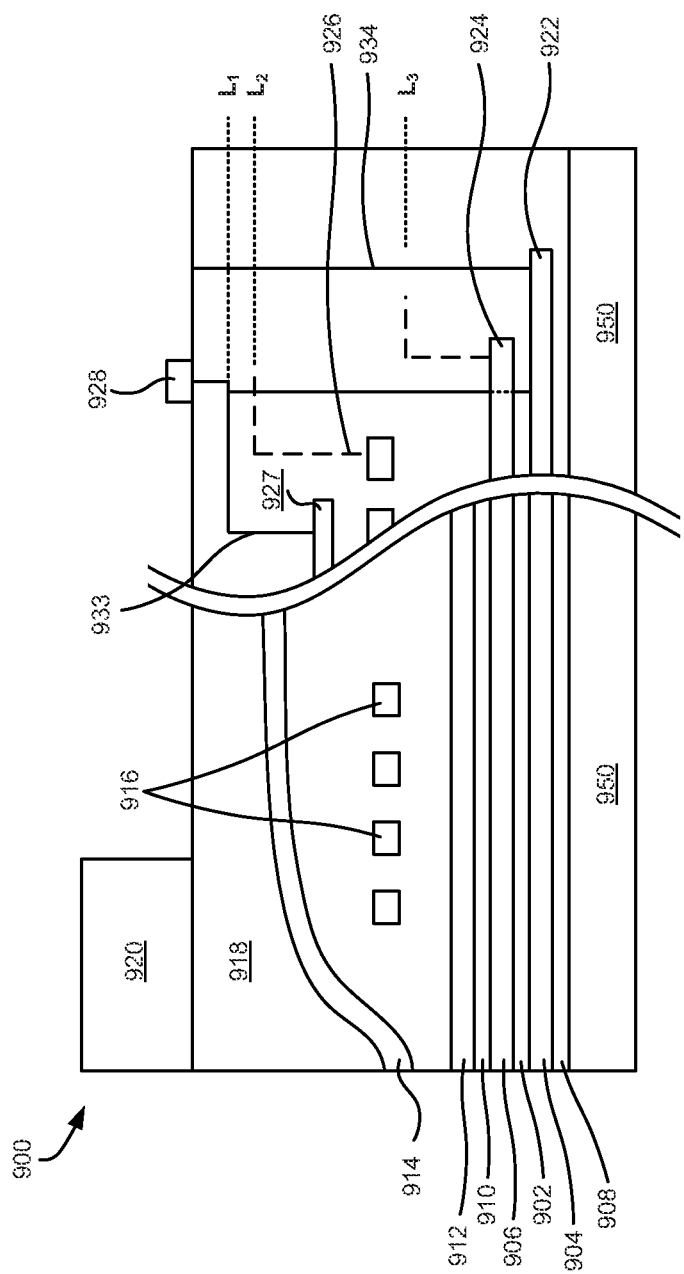
FIG. 9A is a partial cross-sectional view of a module according to another embodiment.
Figure 9B:
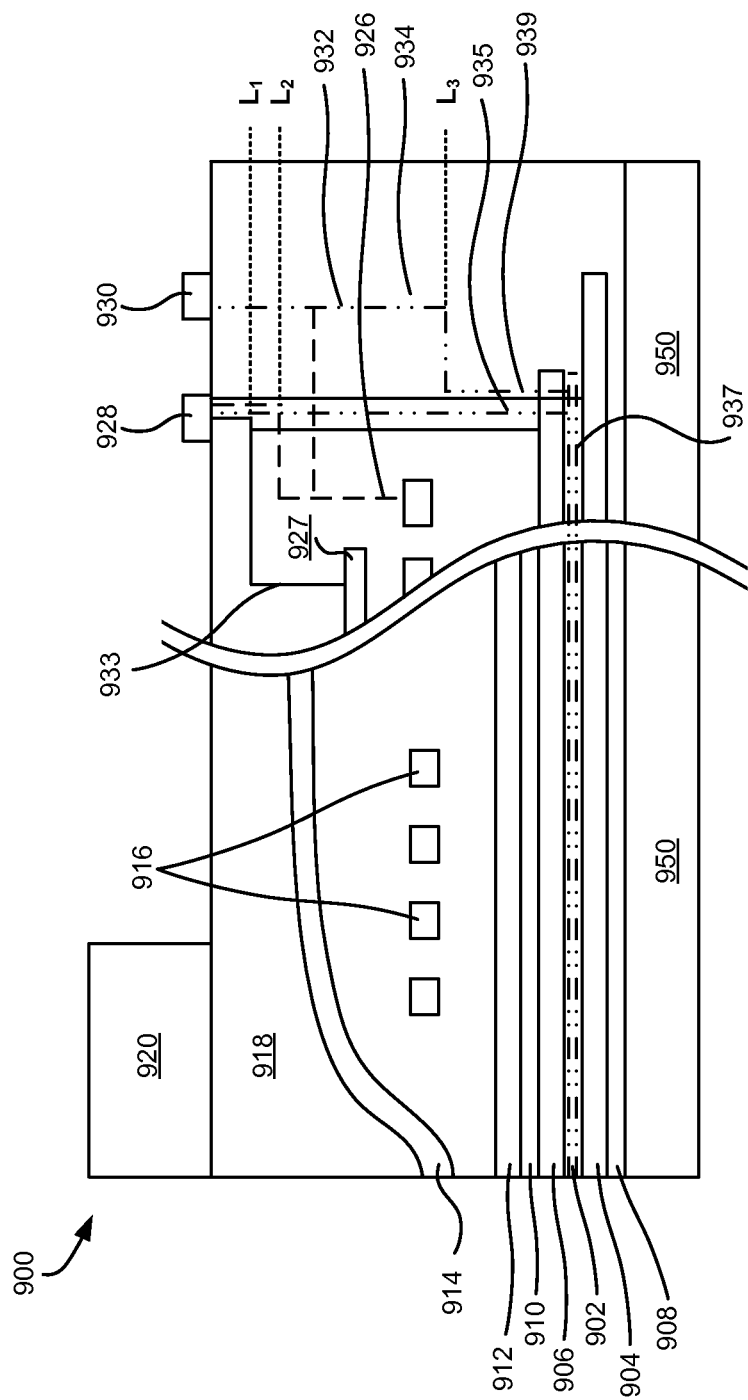
FIG. 9B is a partial cross-sectional view of a module according to yet another embodiment.
Figure 9C:
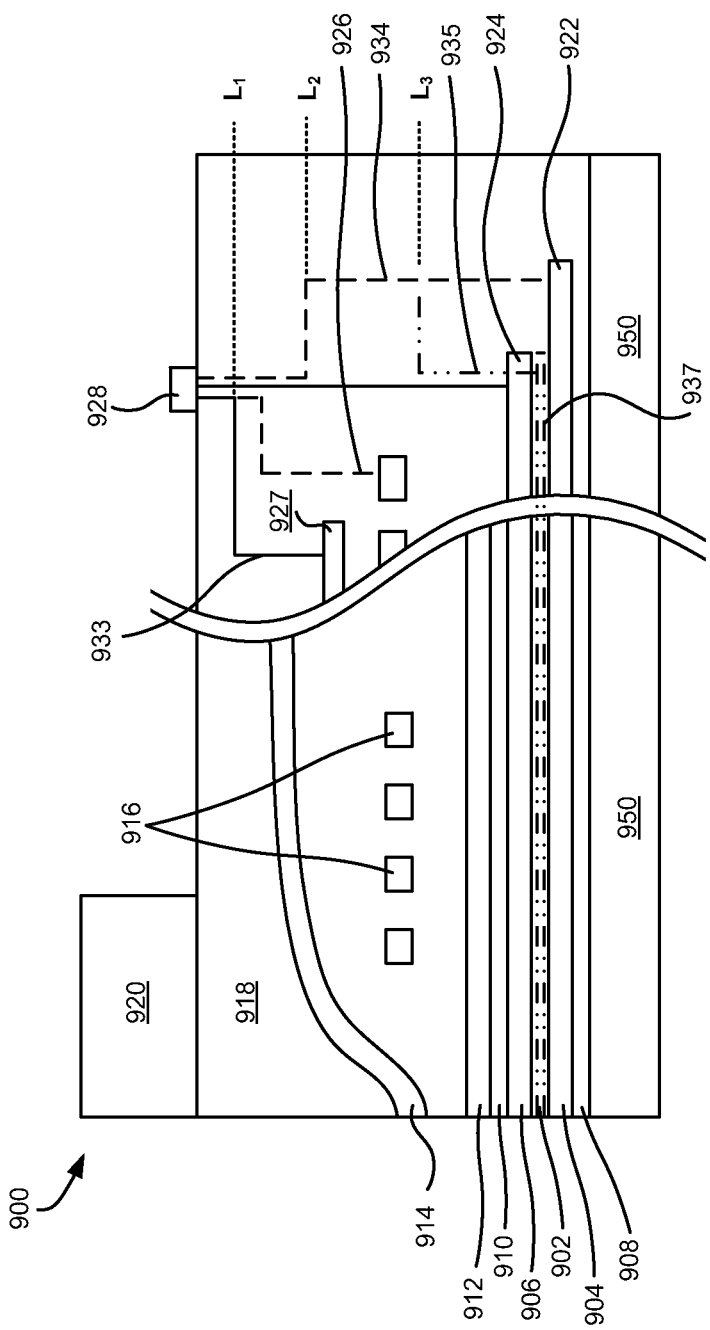
FIG. 9C is a partial cross-sectional view of a module according to yet another embodiment.

In one approach, only a portion (i.e., less than all) of the leads may be in electrical communication with the aforementioned pads via pad-outs. In an example according to one approach, only some of the leads may be brought out to the pads, e.g., as shown in FIG. 9A, depending on which transducers may be used for the target application of the module. In the example shown in FIG. 9C, leads 935 extending from the second data transducer 937 (shown in shadow because it is positioned behind the plane of the view of FIG. 9C) are present in a third level $L_3$ of thin films of the module, and leads from only two of the levels, here $L_1$ $L_2$, are coupled to the pads 928. Moreover, the unconnected leads may simply terminate in the thin film stack of the module, as lead 935 does. In various approaches, a module may include some, at least some, all, none, etc. of the transducers coupled to the pads. As described above, the way the transducers are coupled to the pads determines which transducers are functional in the module.

Figure 11A:
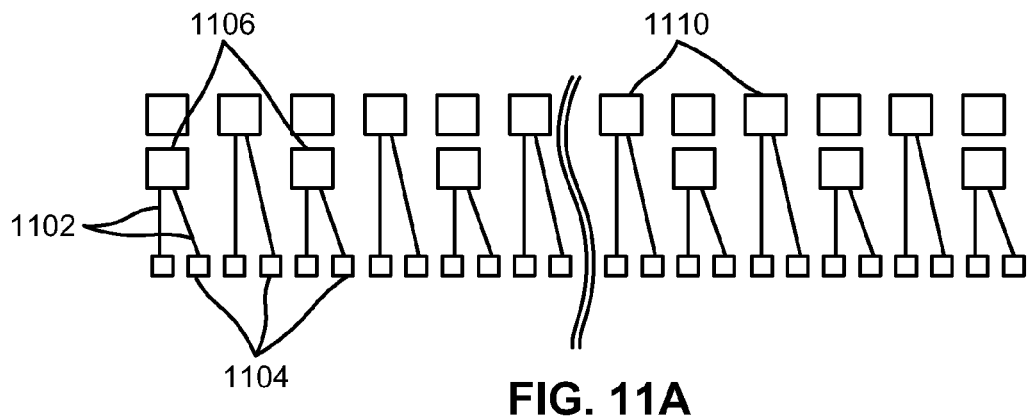
FIGS. 11A-11E are representative diagrams of leads connecting transducers and pads according to several embodiment.
Figure 11B:
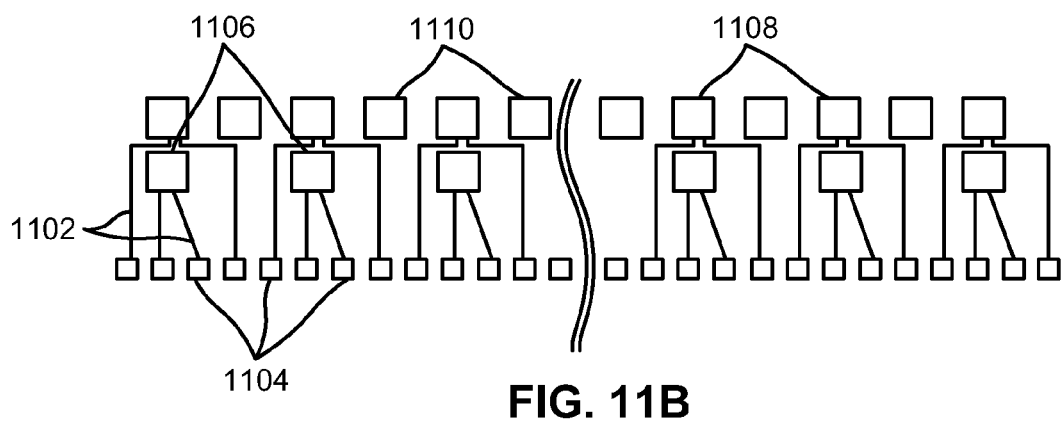
Figure 11C:
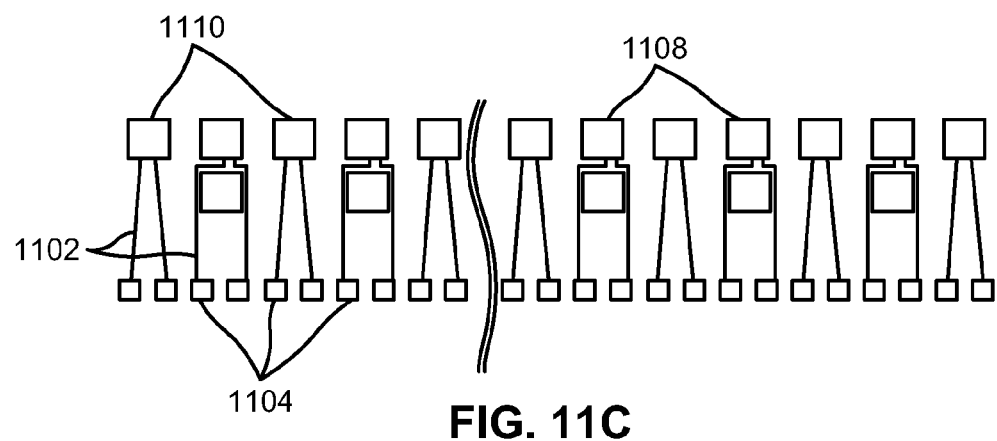

FIGS. 11A-11C depict representative diagrams for connectors 1102, e.g., leads and/or pad-outs, connecting transducers and pads, in accordance with several embodiment. As an option, the present wiring configurations for connectors 1102 may be implemented in conjunction with features from any other embodiment listed herein, such as those described with reference to the other FIGS. Of course, however, such wiring configurations for connectors 1102 and others presented herein may be used in various applications and/or in permutations which may or may not be specifically described in the illustrative embodiments listed herein. Further, the wiring configurations for connectors 1102 presented herein may be used in any desired environment. For example, according to various approaches, the representative diagrams illustrated in FIGS. 11A-11C may incorporate any desired pad layout described and/or suggested herein, or a pad layout which would be apparent to one skilled in the art upon reading the present description, depending on the embodiment.

As illustrated in the interleaved representative diagram of FIG. 11A, the readers 1106 from the piggyback or merged first data transducers and the second data transducers 1110, e.g., writers, are connected to their respective pads 1104 via the connectors 1102.

Referring to FIG. 11B, the piggyback representative diagram now illustrates the readers 1106 and writers 1108 from the piggyback or merged first data transducers are connected to their respective pads 1104 via the connectors 1102, while the second data transducers 1110 are not coupled to pads.

Referring now to FIG. 11C, the representative diagram illustrates a high density write only module in which the writers 1108 from the N piggyback or merged first data transducers and M second data transducers 1110, e.g., writers, are connected to their respective pads 1104 via the connectors 1102.

In one embodiment, all of the transducers on the module may be connected to their respective leads; however, not all leads are coupled to the pads. Therefore, although all the transducers may be connected to their respective leads, only selected leads may be connected to pads.

Figure 11D:
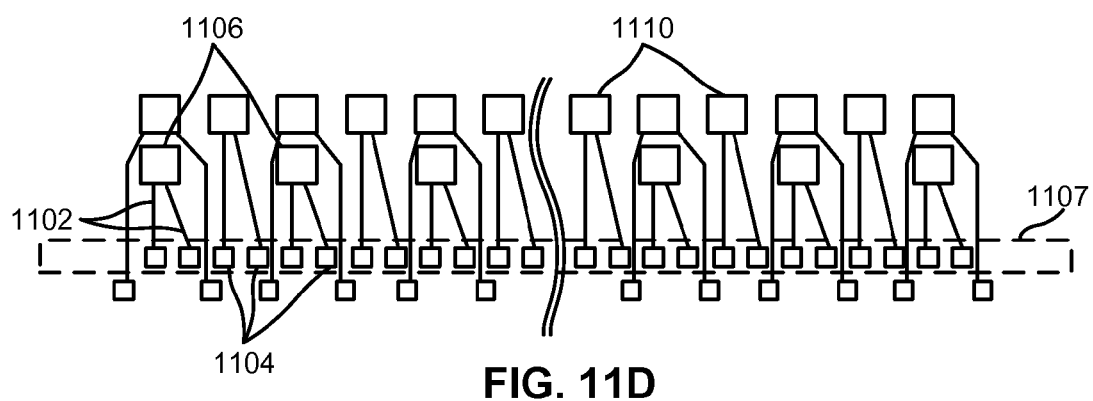
Figure 11E:
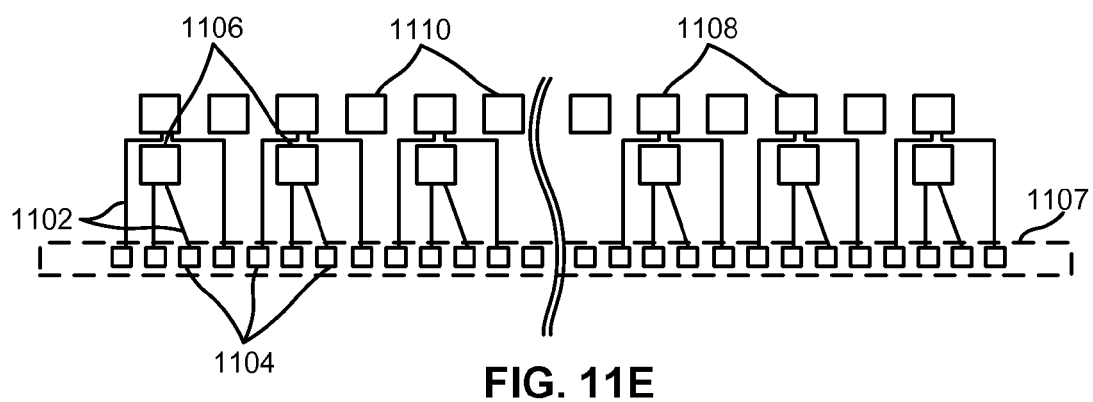

Furthermore, a cable may provide at least a portion of conductive path between a magnetic head and the controller according to any approach described and/or suggested herein. In an exemplary approach, as shown in FIG. 11D, all of the transducers 1106, 1110 on the module may be connected to their respective pads 1104. Thus, although all of the transducers on the module may be connected to their respective pads, the cable 1107 may be coupled to only some of the pads, thereby ultimately determining which transducers are functional in the module. In another approach, not all transducers are coupled to pads, but the cable 1107 is coupled to all of the pads, as shown in FIG. 11E.

In one approach, a cable may connect at least some of the pads from a module to a multiplexer, which in turn couples the cable to the controller. Moreover, the multiplexer may be connected to the controller via a bus, cable, wire, wireless signal, etc.

According to one embodiment, a data storage system may include a magnetic head. In one approach, the magnetic head may include 1, at least 2, at least 3, at least 4, etc. modules according to any of the embodiments described and/or suggested herein. According to various approaches, the modules included in the data storage system may be similar, the same or different from each other.

The data storage system may also include a drive mechanism for passing a magnetic medium over the magnetic head.

The data storage system may further include a controller electrically coupled to the magnetic head. In various approaches, the controller may be electrically coupled via leads, a cable, wirelessly, etc.

The embodiments described and/or suggested herein illustrate module designs compatible with 32 channel products, 16 channel products, etc. These design features may preferably allow all modules to be reusable among different, more preferably all products as described above. Such ability effectively reduces management, complexity, etc. by reducing inventory, wafer processing, etc.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A module, comprising:
   an array of N piggyback or merged first data transducers positioned towards a media facing surface of the module; and
   M second data transducers interleaved with the array of piggyback or merged data transducers, wherein the second data transducers are single data transducers arranged in an alternating fashion with the first data transducers,
   at least some of the data transducers being coupled to pads, wherein the module is a single module.

2. A module as recited in claim 1, wherein all of the first and/or second data transducers are coupled to the pads, wherein M is greater than two.

3. A module as recited in claim 1, wherein less than all of the first and/or second data transducers are coupled to the pads.

4. A module as recited in claim 3, wherein the pads are present in a single row.

5. A module as recited in claim 3, further comprising leads extended from each of the first and second data transducers, wherein only a portion of the leads are in electrical communication with the pads.

6. A module as recited in claim 5, further comprising a plurality of second pads, wherein the second pads are not coupled to any of the data transducers.

7. A module as recited in claim 1, wherein the pads are arranged in a single row, and further comprising leads extending from each of the first and second data transducers, wherein leads extending from data readers of the first data transducers are present in a first level of thin films of the module, wherein leads extending from data writers of the first data transducers are present in a second level of thin films of the module, wherein leads extending from the second data transducers are present in a third level of thin films of the module, wherein leads from only two of the levels are coupled to the pads.

8. A module as recited in claim 1, wherein the pads are arranged in first and second rows, and further comprising leads extending from each of the first and second data transducers, wherein the leads extending from the first data transducers are in electrical communication with the pads in the first row, wherein the leads extending from the second transducers are in electrical communication with the pads in the second row, wherein at least some of the leads extending from the second transducers are also in electrical communication with pads in the first row.

9. A module as recited in claim 1, wherein the first data transducers are piggyback data transducers.

10. A module as recited in claim 1, wherein the first data transducers are merged data transducers.

11. A data storage system, comprising:
a magnetic head having at least one module as recited in claim 1;
a drive mechanism for passing a magnetic medium over the magnetic head;
a controller electrically coupled to the magnetic head; and
a cable providing at least a portion of a conductive path between the magnetic head and the controller, wherein all transducers are coupled to pads, wherein the cable is coupled to only some of the pads.

12. A data storage system, comprising:
a magnetic head having at least one module as recited in claim 1;
a drive mechanism for passing a magnetic medium over the magnetic head;
a controller electrically coupled to the magnetic head; and
a cable providing at least a portion of a conductive path between the magnetic head and the controller, wherein not all transducers are coupled to pads, wherein the cable is coupled to all of the pads.

13. A module, comprising:
an array of N first data transducers positioned towards a media facing surface of the module, the first data transducers including at least one of data readers, data writers, and combinations thereof; and
M second data transducers interleaved with the array of first data transducers, the second data transducers including at least one of data readers,
data writers, and combinations thereof arranged in an alternating fashion with the first data transducers,
wherein less than all of the first and/or second data transducers are coupled to pads,
wherein the module is a single module.

14. A module as recited in claim 13, wherein the second data transducers are single data transducers.

15. A module as recited in claim 13, wherein the pads are present in a single row, wherein N is greater than 4.

16. A module as recited in claim 15, further comprising leads extended from each of the first and second data transducers, wherein only a portion of the leads are in electrical communication with the pads.

17. A module as recited in claim 13, wherein the pads are arranged in a single row, and further comprising leads extending from each of the first and second data transducers, wherein leads extending from data readers of the first data transducers are present in a first level of thin films of the module, wherein leads extending from data writers of the first data transducers are present in a second level of thin films of the module, wherein leads extending from the second data transducers are present in a third level of thin films of the module, wherein leads from only two of the levels are coupled to the pads.

18. A module as recited in claim 13, wherein the pads are arranged in first and second rows, and further comprising leads extending from each of the first and second data transducers, wherein the leads extending from the first data transducers are in electrical communication with the pads in the first row, wherein the leads extending from the second transducers are in electrical communication with the pads in the second row, wherein at least some of the leads extending from the second transducers are also in electrical communication with pads in the first row.

19. A data storage system, comprising:
a magnetic head having at least one module as recited in claim 13;
a drive mechanism for passing a magnetic medium over the magnetic head;
a controller electrically coupled to the magnetic head; and
a cable providing at least a portion of a conductive path between the magnetic head and the controller, wherein all transducers are coupled to pads, wherein the cable is coupled to only some of the pads.

20. A data storage system, comprising:
a magnetic head having at least one module as recited in claim 13;
a drive mechanism for passing a magnetic medium over the magnetic head;
a controller electrically coupled to the magnetic head; and
a cable providing at least a portion of a conductive path between the magnetic head and the controller, wherein not all transducers are coupled to pads, wherein the cable is coupled to all of the pads.

* * * * *